United States Patent
Nakamura

(10) Patent No.: US 6,340,996 B1
(45) Date of Patent: Jan. 22, 2002

(54) γ CORRECTION SYSTEM AND METHOD UTILIZING GRAPH APPROXIMATION

(75) Inventor: Takahiro Nakamura, Hokkaido (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/412,509

(22) Filed: Oct. 5, 1999

(30) Foreign Application Priority Data

Oct. 6, 1998 (JP) .......................................... 10-283690

(51) Int. Cl.[7] .......................... H04N 9/69; H04N 5/202
(52) U.S. Cl. ...................................... 348/675; 348/674
(58) Field of Search .................................. 348/674, 675, 348/677; 358/519; 382/167; H04N 5/202, 9/69

(56) References Cited

U.S. PATENT DOCUMENTS

| | | |
|---|---|---|
| 5,298,915 A | 3/1994 | Bassetti, Jr. |
| 5,303,055 A | 4/1994 | Hendrix et al. |
| 5,483,256 A | 1/1996 | Ohi |
| 5,546,101 A | 8/1996 | Sugawara |
| 5,610,666 A | 3/1997 | Ueda et al. |

FOREIGN PATENT DOCUMENTS

| | | |
|---|---|---|
| EP | 0457522 | 11/1991 |
| EP | 0606993 | 7/1994 |
| EP | 0708433 | 4/1996 |
| EP | 0810778 | 12/1997 |
| EP | 0831643 | 3/1998 |
| EP | 0947975 | 10/1999 |
| JP | 4-18865 | 1/1992 |
| JP | 4271577 | 9/1992 |
| JP | 7152347 | 6/1995 |
| JP | 8-18826 | 1/1996 |
| JP | 9172562 | 6/1997 |
| JP | 10145806 | 5/1998 |

OTHER PUBLICATIONS

An English Language abstract of JP 4–18865.
An English Language abstract of JP 4–271577.
An English Language abstract of 7–152347.
An English Language abstract of JP 8–18826.
An English Language abstract of JP 9–172562.
An English Language abstract of JP 10–145806.

Primary Examiner—Sherrie Hsia
(74) Attorney, Agent, or Firm—Greenblum & Bernstein, P.L.C.

(57) ABSTRACT

A display device has a γ correction circuit based on line graph approximation. A memory stores γ characteristic data of the display device. The γ characteristic value, white level value, contrast value and black level value are input for adjusting the luminance characteristics of input video signals. A γ conversion section sets a slope and intercept of the γ correction so that the input video signal data can be converted to ideal output luminance value of the display.

20 Claims, 10 Drawing Sheets

γ CORRECTION SYSTEM AND METHOD UTILIZING GRAPH APPROXIMATION

BACKGROUND OF THE INVENTION

1. Field of the Invention

The present invention relates to a digital signal processing for such displays as a liquid crystal display and plasma display, and more particularly to a γ correction circuit and a γ correction method where the γ correction of digital video signals is executed by line graph approximation.

2. Description of the Related Art

The relationship of the luminance value (X) of the video signal to be input to the display to the output luminance (Z) of the display is called the "γ characteristic", and the characteristic of a cathode ray tube display, which now dominates the market, is approximated as Z=k·X^γ (γth power of X). Therefore in NTSC type television broadcasting, the γ characteristic of a cathode ray tube display as an image receiver is considered and video signals are transmitted after executing reverse γ correction at γ=2.2.

In the case of a liquid crystal display, on the other hand, the γ characteristic is different from that of a cathode ray tube display, so if the television images and computer images created by a cathode ray tube display are displayed on a liquid crystal display, luminance reproduction will be distorted. To control the distortion of luminance, it is necessary to include a γ correction circuit in the display so as to execute γ correction on the input video signals at an optimum γ value before displaying. However, a γ value optimum for video signals is generally not always the same where γ=2.2 is used in the case of a television, and γ=1.0 is used to expressed the fine difference of gradation and colors when images are created by a personal computer. Also the γ value is different depending on the cathode ray tube display, so in order to reproduce ideal luminance for computer images, it is necessary to execute γ correction based on the γ characteristic of the display used for image creation.

Therefore in order to display these input images with an optimum γ characteristic, a line graph γ correction circuit, which approximates the γ characteristic curve with a plurality of straight lines and executes non-linear processing on digital video signals, is used, as stated in the Japanese Patent Laid-Open No. 8-18826.

Also as a γ correction circuit control method, a display stated in Japanese Patent Laid-Open No. 7-152347 exists, where a plurality of sets of γ correction data, such as slopes and intercepts, are prepared and a switching operation is executed by input signals.

Also as Japanese Patent Laid-Open No. 10-145806 states, there is a display which holds the plurality of γ correction data separately for each R, G and B, and white balance adjustment is executed by the γ correction circuit at the same time as γ correction.

A conventional type γ correction method will now be explained with reference to FIG. 2. In FIG. 2, 220 is a storage device for storing γ correction data corresponding to n number of γ values, such as a first γ correction data 221, a second γ correction data 222 and so on until the nth γ correction data 223. 230 is a line graph γ correction circuit. In the line graph γ correction circuit 230, 231 is a decoder which outputs a signal to the line graph block for the input video signal data. 232 is a slope data selector which outputs a slope data, 233 is an intercept data selector which outputs an intercept data, 234 is a multiplier, 235 is an adder and 236 is a limiter which executes limiter processing on the video data.

210 is a γ conversion section. A γ correction selection section 211 reads one data from the n number of re-γ corrected data in the storage device 220 based on the γ1 value which was input. The calculation section 212 calculates the slope and intercept of each straight line of the line graph in FIG. 3 using the re-γ corrected data which was read.

By storing γ correction data having a target γ characteristic in the storage device 220 in advance, optimum γ correction is possible for a video signal having a plurality of γ characteristics. White balance can also be adjusted by preparing the configuration in FIG. 2 for three colors: R, G and B.

With the conventional method, however, the correction data must be stored in the storage device for the assumed number of γ characteristics and white balances, so an increase in the capacity of the storage device is indispensable to support the subtle changes of γ values and white balance.

With the foregoing in view, it is an object of the present invention to provide a display which implements subtle γ correction, and digital white balance adjustment, as well as black level and contrast adjustment by digital signal processing using the above line graph γ correction circuit and a small capacity storage device.

SUMMARY OF THE INVENTION

To solve the above problems, the display of the present invention has a γ correction circuit for correcting digital video signals by line graph approximation, where the storage device holds a γ characteristics of the display device, and video signals being input are displayed at the desired γ characteristics, black level, contrast and white balance using a micro-controller, which calculates the slope and intercept of the line graph by the γ characteristic of the display device, data which was input by the γ value input means, white balance input means, black level input means, and contrast value input means, and the ideal γ curve, and sets the slope and intercept of the line graph to the γ correction circuit.

A first aspect of the present invention is a γ correction circuit for executing reverse γ1 correction on pre-γ1 corrected input video data and then executing γ2 correction, comprising: means for setting a representative luminance value; primary conversion means for executing reverse γ1 correction on the representative luminance value so as to generate a primary conversion value; secondary conversion means for executing γ2 correction on the primary conversion value so as to generate a secondary conversion value; means for generating a slope and intercept of each straight line of a line graph which pole is the secondary conversion value; and line graph γ correction means for executing γ correction on the input video data by the line graph.

A second aspect is a γ correction circuit according to the first aspect, wherein the above mentioned primary conversion means receives a γ1 value.

A third aspect is a γ correction circuit according to the first aspect, wherein the above mentioned primary conversion means receives a γ1 value and a black level value.

A fourth aspect is a γ correction circuit according to the first aspect, wherein the above mentioned primary conversion means receives a γ1 value and a contrast value.

A fifth aspect is a γ correction circuit according to the first aspect, wherein the above mentioned primary conversion means receives a γ1 value, a red adjustment value, a green adjustment value and a blue adjustment value.

A sixth aspect is a γ correction circuit according to the first aspect, wherein the above mentioned secondary conversion means has a table denoting a relationship between pre- γ2 correction and post γ2 correction.

A seventh aspect is a γ correction circuit according to the first aspect, wherein the above mentioned y1 value is a γ correction value for a cathode ray tube display.

An eighth aspect is a γ correction circuit according to the first aspect, wherein the above mentioned γ2 correction is a γ correction for a liquid crystal display.

A ninth aspect is a γ correction circuit according to the first aspect, wherein the above mentioned γ2 correction is a γ correction for a plasma display.

A tenth aspect is a γ correction method for executing reverse γ1 correction on pre-γ1 corrected input video data and then executing γ2 correction comprising steps of: setting a representative luminance value; executing a reverse γ1 correction on the representative luminance value so as to generate a primary conversion value; executing γ2 correction on the primary conversion value so as to generate a secondary conversion value; generating a slope and intercept of each straight line of a line graph which pole is the secondary conversion value; and executing γ correction on the input video data by the line graph.

DESCRIPTION OF THE PREFERRED EMBODIMENTS (Embodiment 1)

Figure 1:
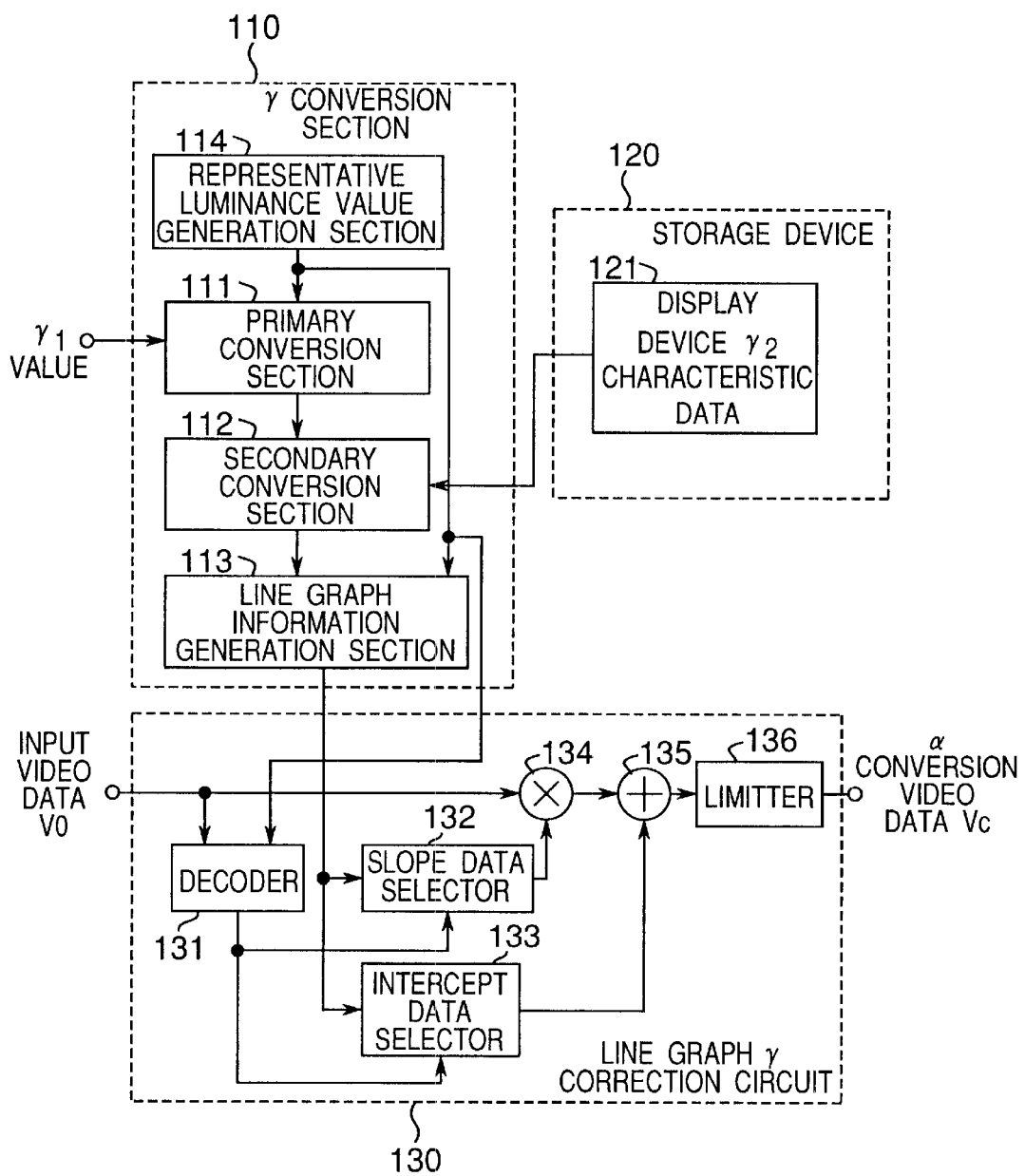
FIG. 1 is a block diagram of a γ correction circuit of the embodiment 1.
Figure 2:
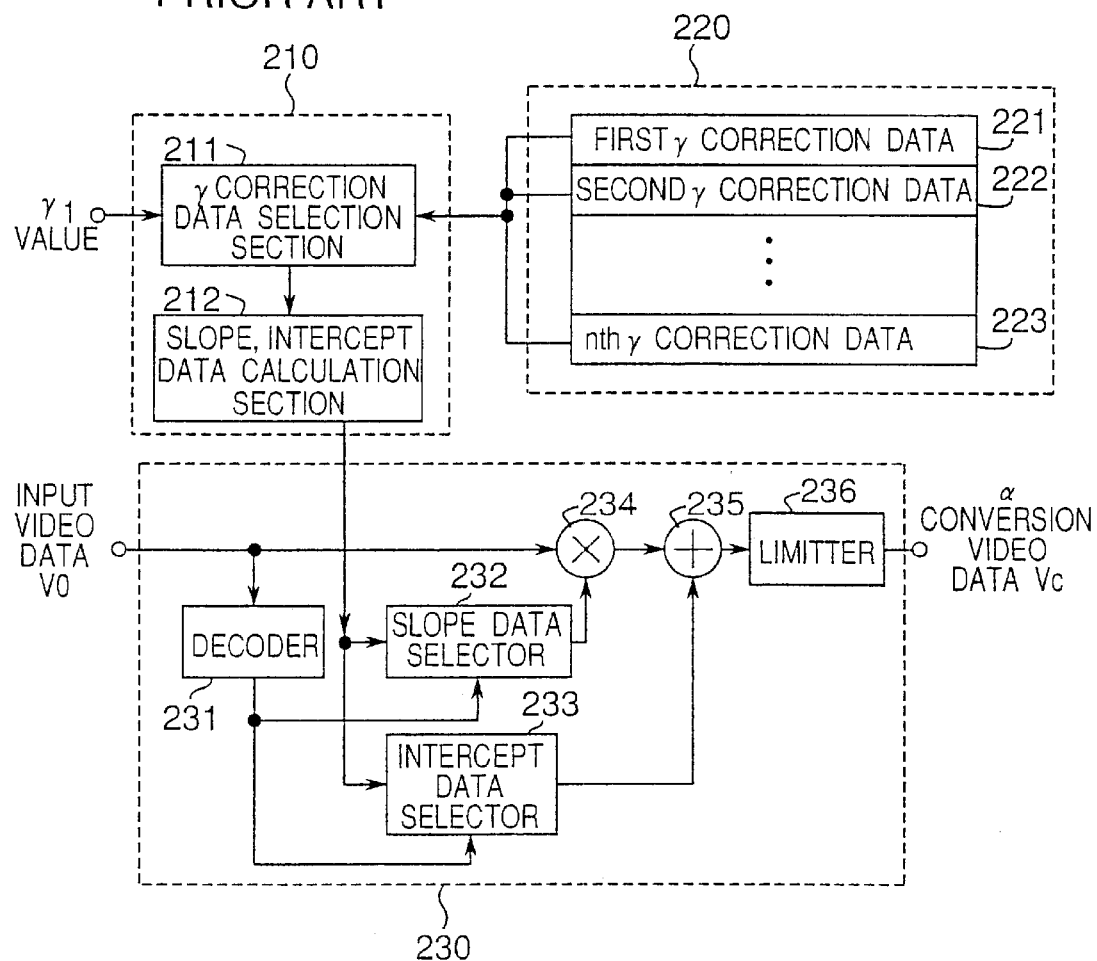
FIG. 2 is a block diagram of a conventional γ correction circuit.
Figure 3:
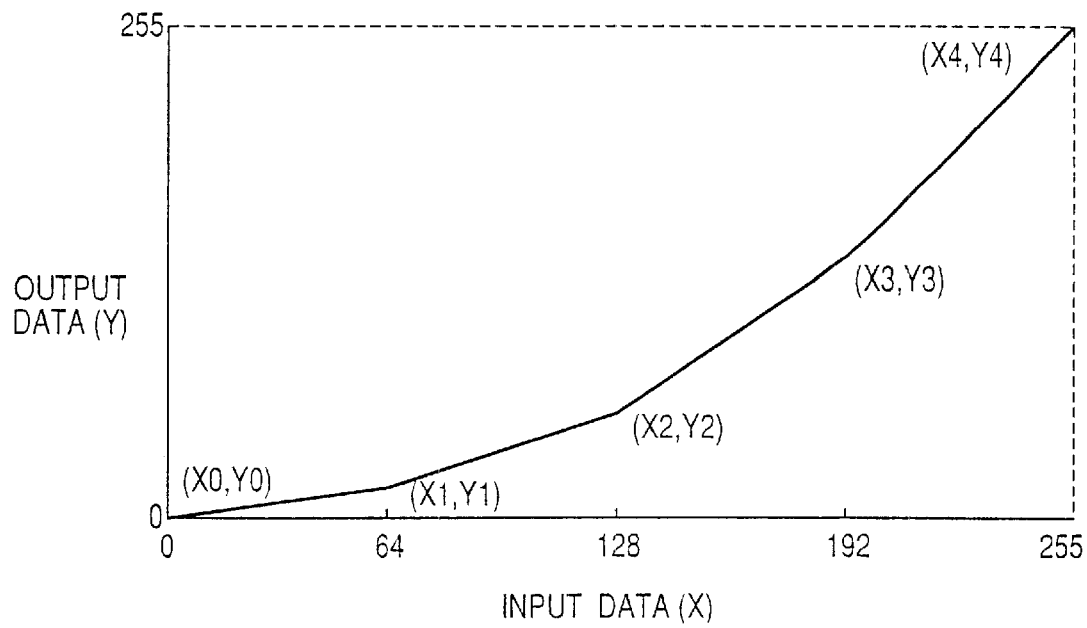
FIG. 3 is a drawing depicting the input/output relationship of the image data of the line graph γ correction circuit in FIG. 2.

FIG. 1 is a block diagram of a γ correction circuit of the embodiment 1 of the present invention. In FIG. 1, 110 is a γ conversion section, 120 is a storage device, and 130 is a line graph γ correction circuit. An input video data VO, which is γ-corrected with a γ1 value, is input to the line graph γ correction circuit 130, and the γ2-corrected γ conversion video data Vc is output.

The γ conversion section 110 comprises a primary conversion section 111, a secondary conversion section 112, a line graph information generation section 113, and a representative luminance value generation section 114.

Figure 4:
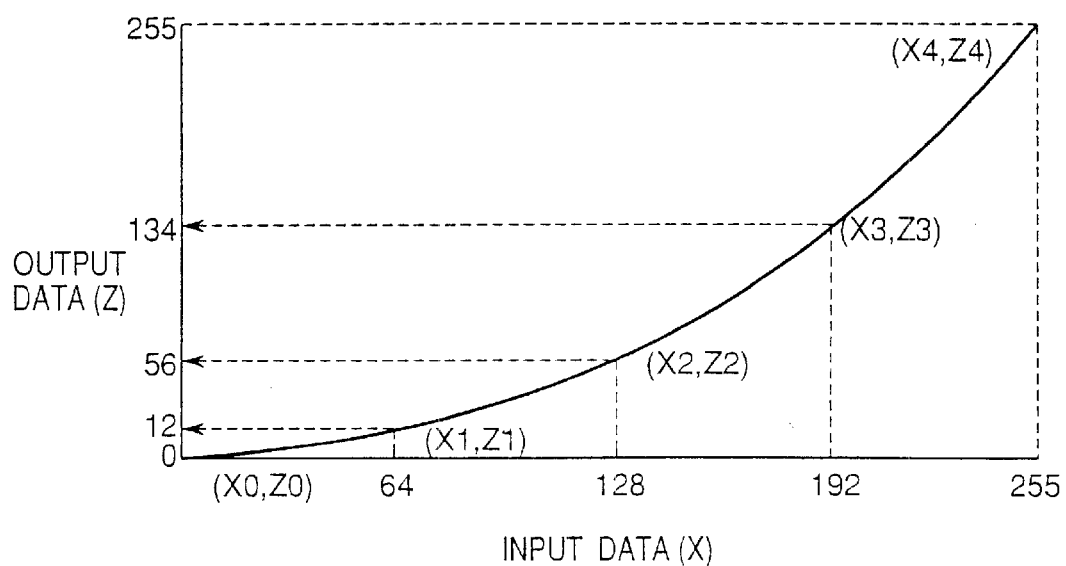
FIG. 4 is a drawing depicting an ideal γ characteristic with γ=2.2.

The primary conversion section 111, to which an γ1 value is input, outputs a reverse γ1 conversion value Z for the representative luminance value X sent from the representative luminance value generation section 114. As FIG. 4 shows, in this embodiment, three representative luminances, X1, X2 and X3 (=64, 128, 192) are sequentially sent from the representative luminance value generation section 114. In the primary conversion section, the following expression (1)

$$Z=255*(X/255)^{\gamma 1} \quad (1)$$

is stored and the primary conversion section 111 converts the above three representative luminance values X1, X2 and X3 (=64, 128, 192) to primary conversion values Z1, Z2 and Z3 using the γ1 value which was input, 2.2 for example. In this example, the following calculation is executed by the primary conversion section 111.

$$Z1=255*(64/255)^{2.2}=12$$

$$Z2=255*(128/255)^{2.2}=56$$

$$Z3=255*(192/255)^{2.2}=134$$

Conversion from the representative luminance value X to the primary conversion value Z is shown by the dotted line arrow mark in FIG. 4. As FIG. 4 shows, reverse γ1 conversion is executed on the representative luminance value X, and the representative luminance value X becomes the primary conversion value Z.

Figure 5:
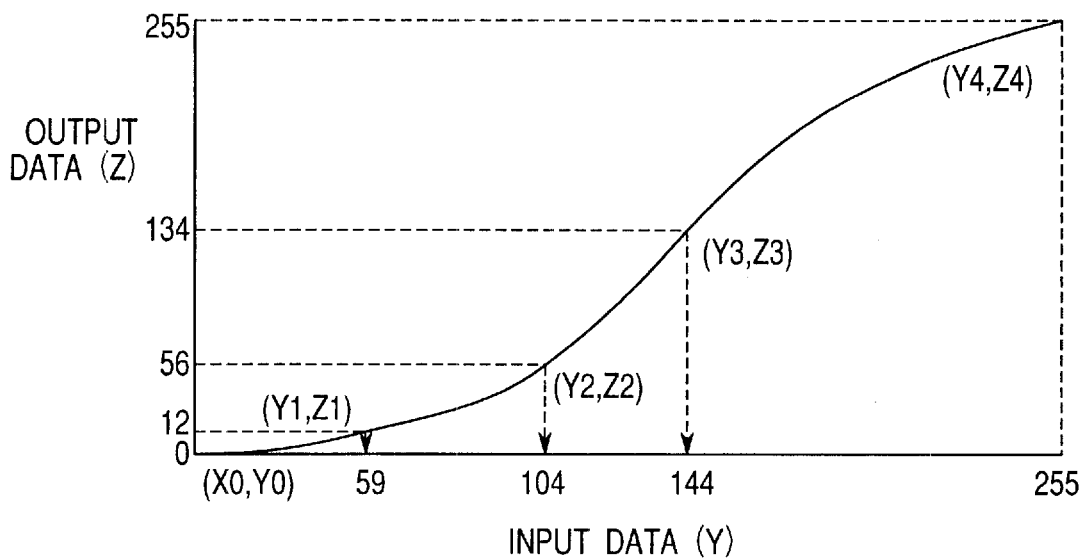
FIG. 5 is a drawing depicting an example of γ characteristics of a display device.

The secondary conversion section 112 converts the primary conversion values Z1, Z2 and Z3 sent from the primary conversion section 111 to the secondary conversion values Y1, Y2 and Y3 respectively. The secondary conversion section 112 executes the conversion using the table 121 stored in the non-volatile storage device 120. The table 121 has γ2 characteristic data 121 on the display device, as shown in FIG. 5. Using this table 121, the primary conversion values Z1, Z2 and Z3 (=12, 56, 34), which were input to the secondary conversion section 112, are converted to the secondary conversion values Y1, Y2 and Y3 (=59, 104, 144) respectively. In other words, in the secondary conversion, γ2 conversion is executed on the representative luminance values which were reverse γ1 converted.

γ1 correction and γ2 correction are γ corrections to be used for different types of displays, where γ1 is a γ correction to be used for a cathode ray tube, for example, and γ2 correction is a γ correction to be used for a liquid crystal display and plasma display, for example.

The line graph information generation section 113 receives the secondary conversion values Y1, Y2 and Y3 (=59, 104, 144) from the secondary conversion section 112, and also receives the representative luminance values X1, X2 and X2 (=64, 128, 192) from the representative luminance value generation section 114. The line graph information generation section 113 also stores the minimum value X0 and the maximum value X4 of the representative luminance values, and the minimum value Z0 and the maximum value Z4 of the primary conversion values. The minimum value Y0 and the maximum value Y4 of the secondary conversion value are the same values as the minimum value Z0 and the maximum value Z4 of the primary conversion values respectively. In the embodiment 1, the luminance display has 256 grayscales, the minimum values X0 and Y0 are both 0, and the maximum values X4 and Y4 are both 255.

Figure 6:
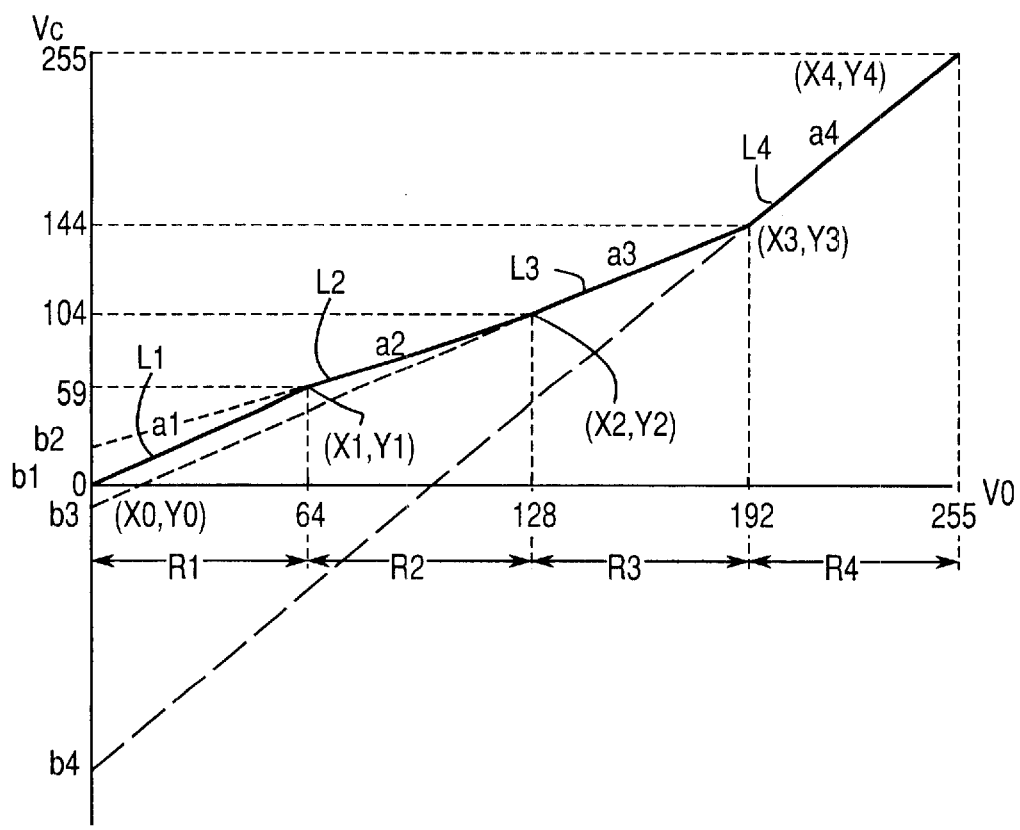
FIG. 6 is a drawing depicting the input/output relationship of the image data of the line graph γ correction circuit.

The line graph information generation section 113 generates the slope a1 of the straight line L1 from (X0, Y0) to (X1, Y1) and the intercept b1 crossing the y axis, the slope a2 of the straight line L2 from (X1, Y1) to (X2, Y2) and the intercept b2 crossing the Y axis, the slope a3 of the straight line L3 from (X2, Y2) to (X3, Y3) and the intercept b3 crossing the y axis, and the slope a4 of the line L4 from (X3, Y3) to (X4, Y4) and the intercept b4 crossing the y axis, using (X0, Y0), (X1, Y1), (X2, Y2), (X3, Y3) and (X4, Y4) values, which indicate the poles of the line graph, as shown in FIG. 6.

The line graph shown in FIG. 6 denotes a characteristic curve when the reverse γ1 conversion is executed then γ2 conversion is executed.

The line graph γ correction circuit 130 comprises a decoder 131, a slope data selector 132, an intercept data selector 133, a multiplier 134, an adder 135 and a limiter 136. The line graph γ correction circuit 130, to which input video data Vo is input, executes γ conversion (that is, executes reverse γ1 correction then γ2 correction) using the slope data and the intercept data from the line graph information generation section 113, and outputs the γ conversion video data Vc.

The representative luminance values X1, X2 and X2 (=64, 128, 192) are input from the representative luminance value generation section 114, and the input video data Vo, to which γ1 conversion has been executed, is also input to the decoder 131. The decoder 131 specifies the luminance area R1, R2, R3 or R4 delimited by the representative luminance values X1, X2 and X3 (=64, 128, 192) related to the input video data Vo, and sends the specified area data to the slope data selector 132 and the intercept data selector 133. When the luminance grayscale of the input video data Vo is expressed as 8-bit data, the decoder 131 can specify the luminance area related to the input video data Vo if the higher 2 bits are detected. Based on the area data, the slope data selector 132 selects the slope data of the straight line included in the area, and sends the slope data to the multiplier 134.

Based on the area data, the intercept data selector 133 selects the intercept data of the straight line included in the area, and sends the intercept data to the adder 135.

The multiplier 134 multiplies the input video data Vo by the selected slope data, and the adder 135 adds the intercept data to the multiplication result. In other words, the adder 135 outputs Vo * a+b value data, and the γ conversion video data Vc is output via the limitter 136. The limiter 136 is a circuit to limit the γ conversion video data not to exceed the predetermined threshold when a luminance value which exceeds the threshold is generated.

According to the above configuration, even if the γ correction has been executed in advance, an approximate line graph with an optimum γ characteristic curve for the display can be generated for the input video data Vo which was sent, by inputting the γ value (2.2 for example, or another value) of the input video data Vo to the γ conversion section 110, and as a result, a desired display can be implemented. Therefore, a γ correction with detailed γ values can be executed even if the correction data is not stored in the storage device.

(Embodiment 2)

Figure 7:
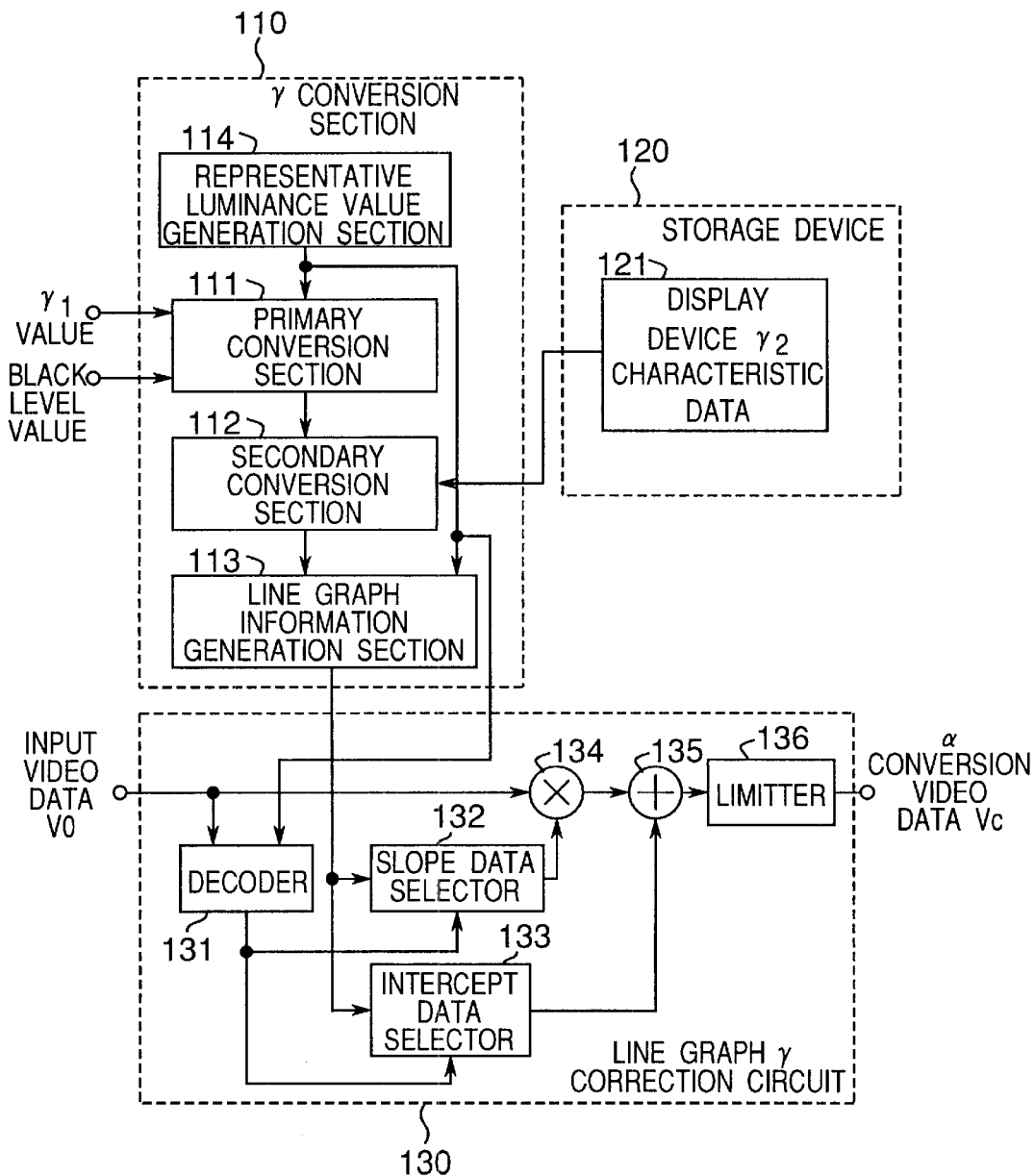
FIG. 7 is a block diagram of a γ correction circuit of the embodiment 2.

FIG. 7 shows a block diagram of the γ correction circuit of the embodiment 2. The differences from the block diagram in FIG. 1 are that not only the γ1 value but also the black level value K is input to the primary conversion section 111, and that the calculation expression used by the primary conversion section 111 is the following expression (2).

$$Z=255*(X/255)^{\gamma 1}+K \quad (2)$$

Figure 8:
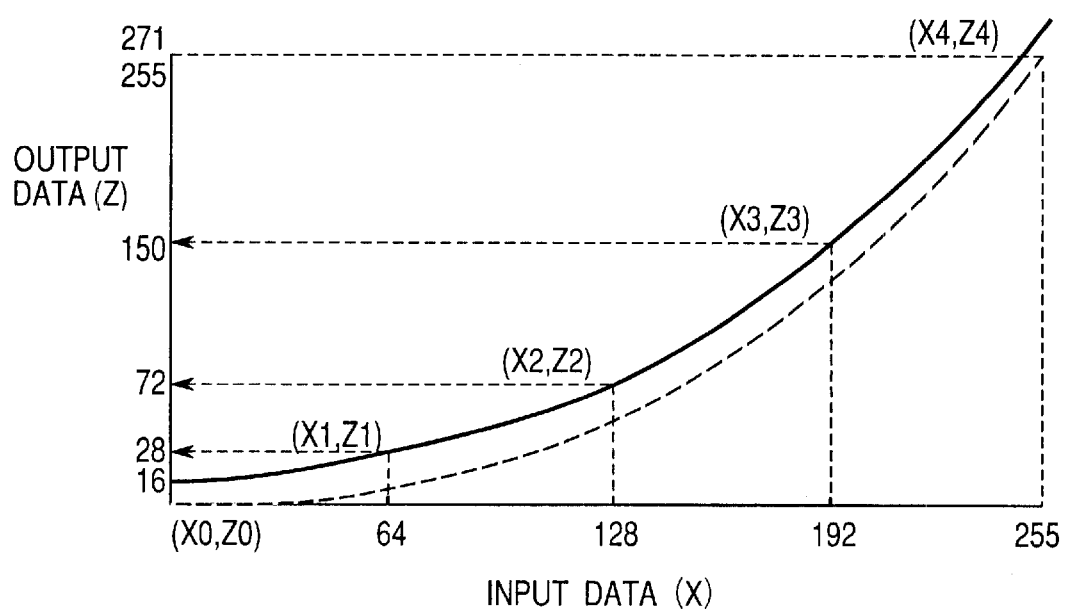
FIG. 8 is a drawing depicting the γ characteristics of the display after black level correction and γ correction are executed in the embodiment 2.

FIG. 8 shows an example when the black level value K is 16.

The above three representative luminance values, X1, X2 and X3 (=64, 128, 192) are converted to the primary conversion values Z1, Z2 and Z3 respectively using the γ1 value, 2.2 for example, and the black level value K, 16 for example, which were input. In this example, the following calculation is executed by the primary conversion section 111.

$$Z1=255*(64/255)^{2.2}+16=28$$

$$Z2=255*(128/255)^{2.2}+16=72$$

$$Z3=255*(192/255)^{2.2}+16=150$$

The minimum value Z0 and the maximum value Z4 of the primary conversion values become 16 and 271 respectively, since the black level value K=16 is added.

Hereafter, γ correction is executed in the same way as in embodiment 1.

According to this configuration, γ correction with detailed γ values is possible even if the correction data is not stored in the storage device, and black level adjusting using the γ correction circuit is possible.

(Embodiment 3)

Figure 9:
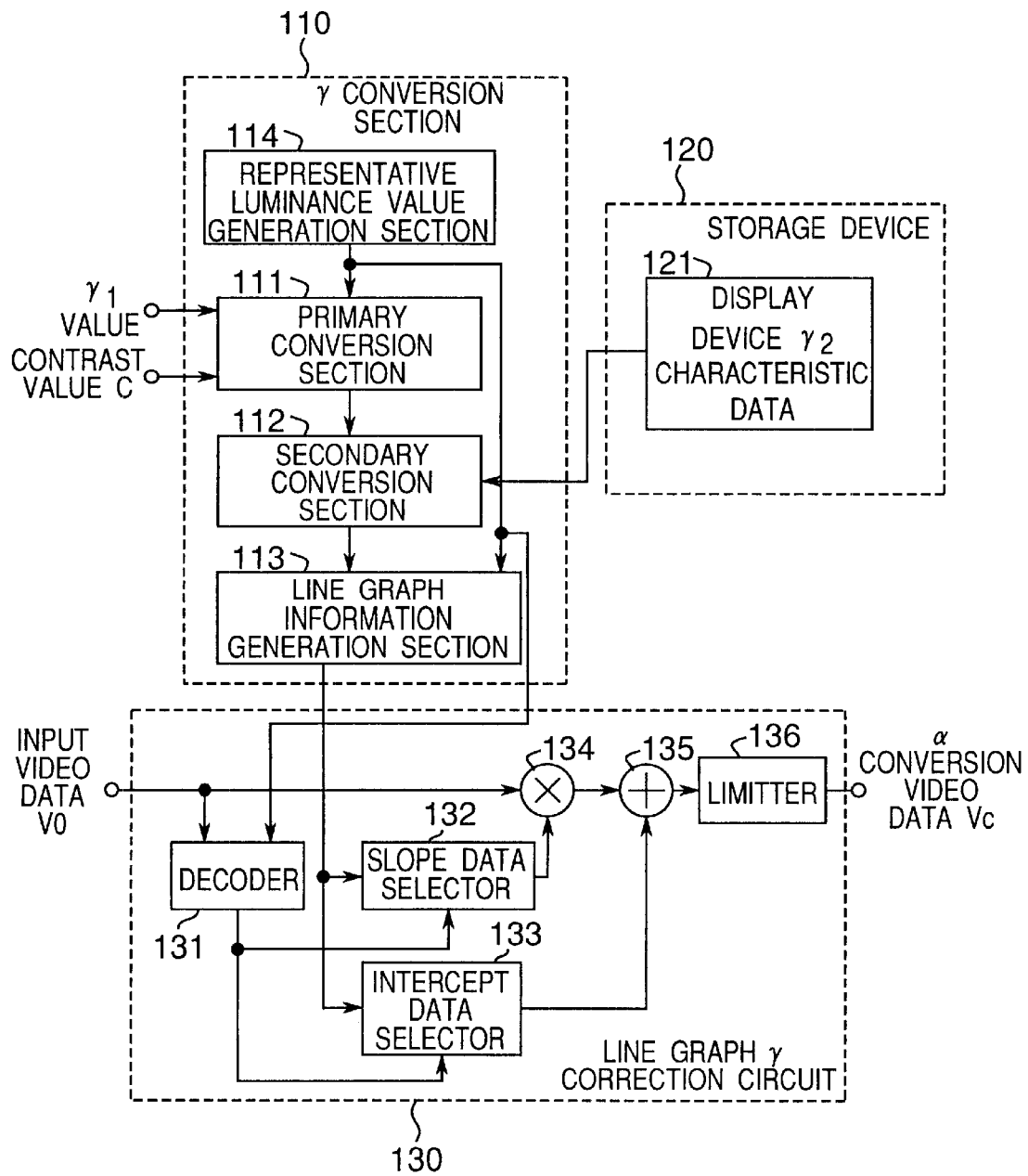
FIG. 9 is a block diagram of a γ correction circuit of the embodiment 3.

FIG. 9 shows a block diagram of the γ correction circuit of the embodiment 3. The differences from the block diagram in FIG. 1 are that not only the γ1 value but also contrast value C is input to the primary conversion section 111, and that the calculation expression used by the primary conversion section 111 is the following expression (3).

$$Z=(C/100)*255*(X/255)^{\gamma 1} \quad (3)$$

Figure 10:
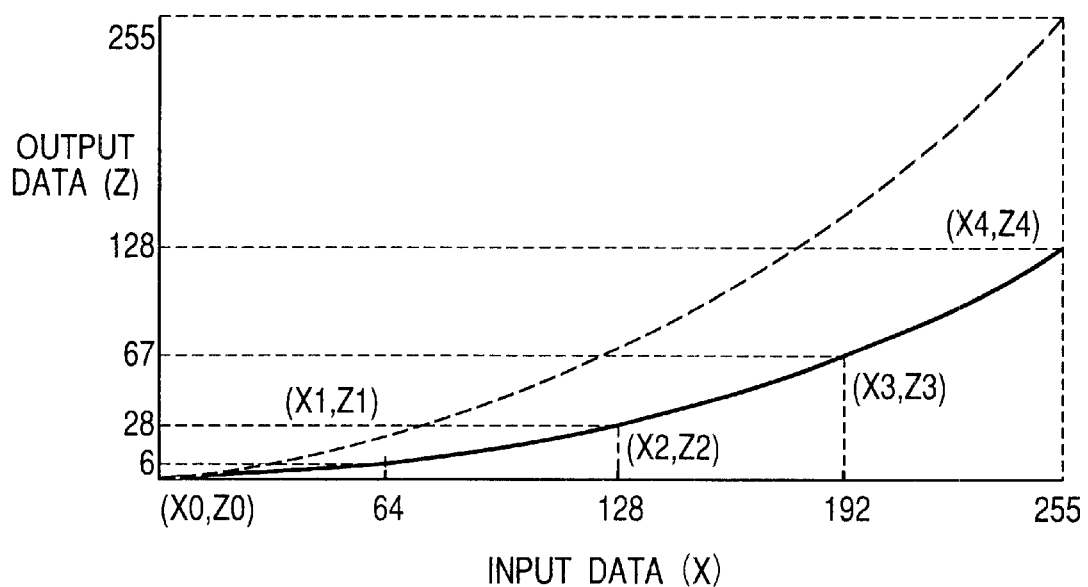
FIG. 10 is a drawing depicting the γ characteristics of the display after contrast correction and γ correction are executed in the embodiment 3.

FIG. 10 shows an example when the contrast value is 50.

The above three representative luminance values X1, X2 and X3 (=64, 128, 192) are converted to the primary conversion values Z1, Z2 and Z3 respectively using the γ1 value, 2.2 for example, and the contrast value C, 50 for example, which were input. In this example, the following calculation is executed by the primary conversion section 111.

$$Z1=0.5*255*(64/255)^{2.2}=6$$

$$Z2=0.5*255*(128/255)^{2.2}=28$$

$$Z3=0.5*255*(192/1255)^{2.2}=67$$

The minimum value Z0 and the maximum value Z4 of the primary conversion values become 0 and 128 respectively, since they are multiplied by the contrast value C.

Hereafter γ correction is executed in the same way as in the embodiment 1.

According to this configuration, γ correction with detailed γ values is possible even if the correction data is not stored in the storage device, and the contrast adjustment using the γ correction circuit is possible.

(Embodiment 4)

Figure 11:
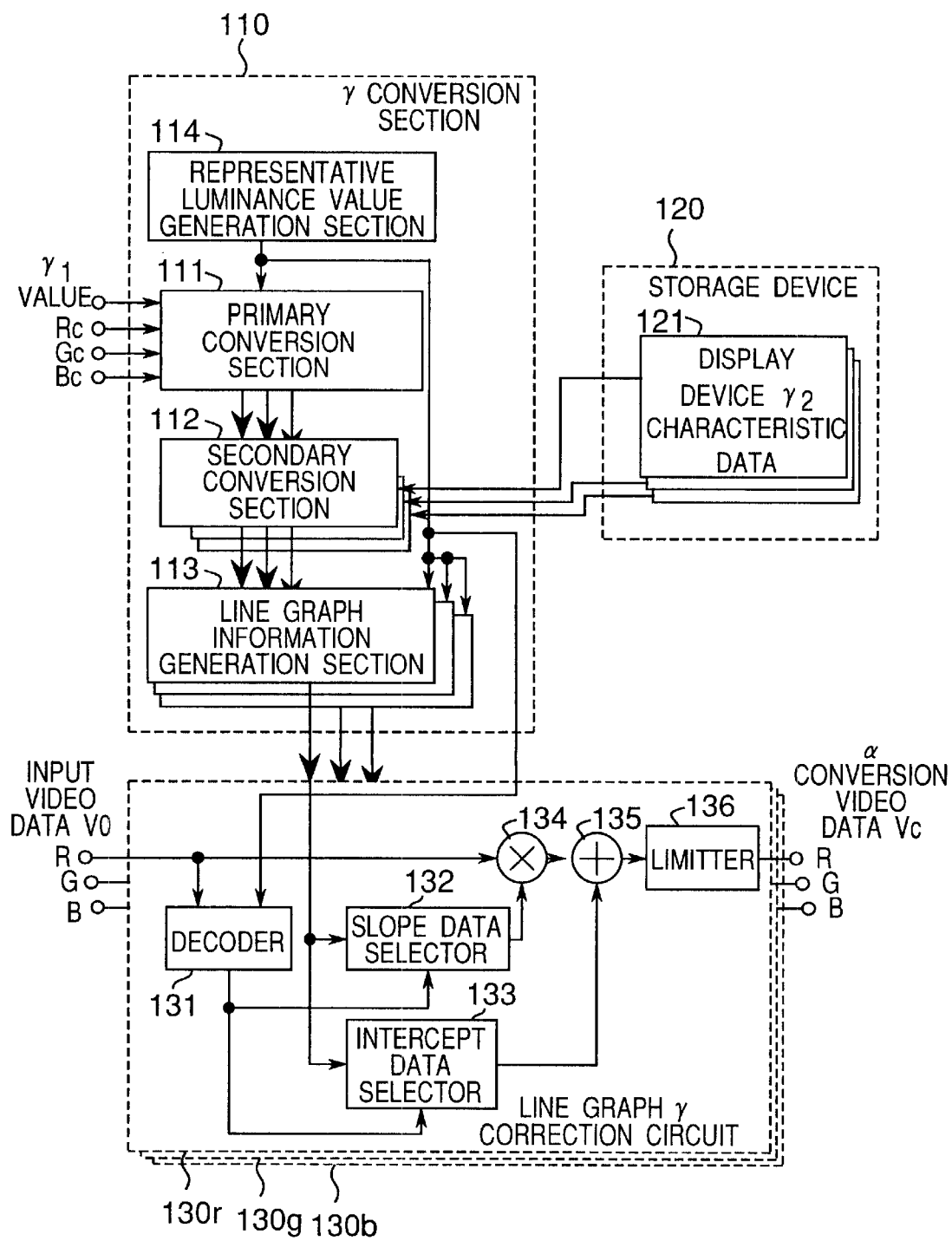
FIG. 11 is a block diagram of a γ correction circuit of the embodiment 4.

FIG. 11 shows a block diagram of the γ correction circuit of the embodiment 4. The differences from the block diagram in FIG. 1 are that not only the γ1 value but also red adjustment value Rc, green adjustment value Gc and blue adjustment value Bc for white balance adjustment are input to the primary conversion section 111, and that the calculation expression used by the primary conversion section 111 is the following expressions (4a), (4b) and (4c).

$$Z=(Rc/100)*255*(X/255)\hat{}\gamma 1 \quad (4a)$$

$$Z=(Gc/100)*255*(X/255)\hat{}\gamma 1 \quad (4b)$$

$$Z=(Bc/100)*255*(X/255)\hat{}\gamma 1 \quad (4c)$$

Figure 12:
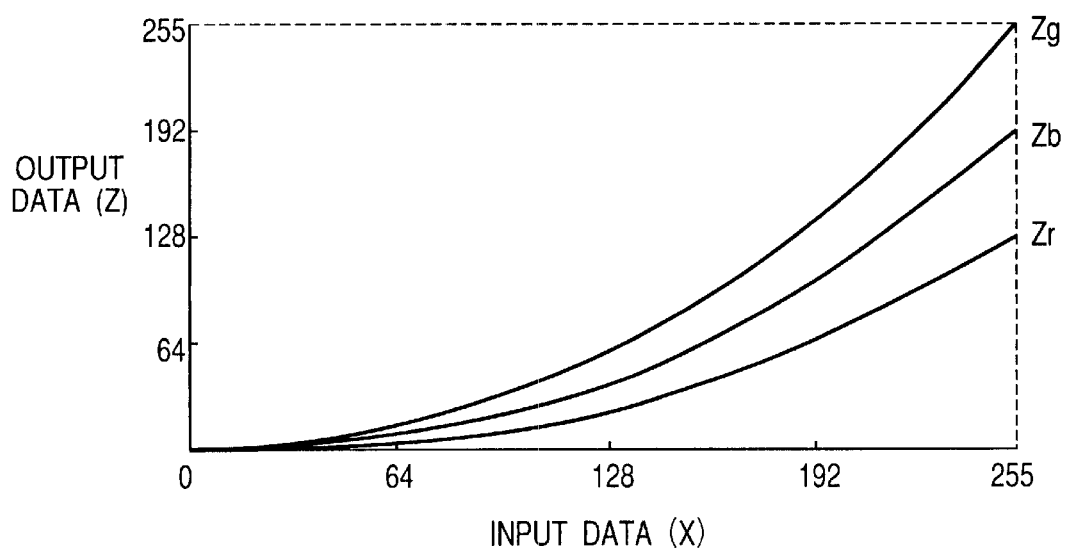
FIG. 12 is a drawing depicting the γ characteristics (R, G, B) of the display after the white balance correction and γ correction are executed in the embodiment 4.

FIG. 12 shows an example when the red adjustment value Rc, the green adjustment value Gc and the blue adjustment value Bc are 50, 100 and 75 respectively.

The above three representative luminance values X1, X2 and X3 (=64, 128, 192) are converted to the primary conversion values of red adjustment Zr1, Zr2 and Zr3 respectively using the γ1 value, 2.2 for example, and the red adjustment value Rc, 50 for example, which were input. In this example, the following calculation is executed by the primary conversion section 111.

$$Zr1=0.5*255*(64/255)\hat{}2.2=6$$

$$Zr2=0.5*255*(128/255)\hat{}2.2=28$$

$$Zr3=0.5*255*(192/255)\hat{}2.2=67$$

Also the above three representative luminance values X1, X2 and X3 (=64, 128, 192) are converted to the primary conversion values of green adjustment Zg1, Zg2 and Zg3 respectively using the γ1 value, 2.2 for example, and the green adjustment value Gc, 100 for example, which were input. In this example, the following calculation is executed by the primary conversion section 111.

$$Zg1=1*255*(64/255)\hat{}2.2=12$$

$$Zg2=1*255*(128/255)\hat{}2.2=56$$

$$Zg3=1*255*(192/255)\hat{}2.2=134$$

Also the above three representative luminance values X1, X2 and X3 (=64, 128, 192) are converted to the primary conversion values of blue adjustment Zb1, Zb2 and Zb3 respectively using the γ1 value, 2.2 for example, and the blue adjustment Bc, 75 for example, which were input. In this example, the following calculation is executed by the primary conversion section 111.

$$Zb1=0.75*255*(64/255)\hat{}2.2=9$$

$$Zb2=0.75*255*(128/255)\hat{}2.2=42$$

$$Zb3=0.75*255*(192/255)\hat{}2.2=100$$

For the minimum value Z0 and the maximum value Z4 of the primary conversion values, the minimum value becomes 0, and the maximum value becomes 128 for red adjustment, 255 for green adjustment, and 192 for blue adjustment since the maximum value is multiplied by the adjustment value.

The line graph γ correction circuit is also available for red 130r, for green 130g and for blue 130b, where γ correction is executed for each color respectively in the same manner as the embodiment 1.

According to this configuration, γ correction with detailed γ values is possible even if the correction data is not stored in the storage device, and white balance adjustment using the γ correction circuit is possible.

In the above embodiments, a line graph using four straight lines was created, but the number of straight line is not limited to four, but may be any number. Needless to say, a more detailed γ correction can be executed as the number of straight lines increase.

According to the display of the present invention, detailed γ correction, white balance adjustment, black level adjustment and contrast adjustment can be provided by digital signal processing by using a storage device storing γ characteristics of the display device and the line graph γ correction circuit.

The present disclosure relates to subject matter contained in Japanese Patent Application No. HEI 10-283690, filed on Oct. 6, 1998, the contents of which are herein expressly incorporated by reference in its entirety.

What is claimed is:

1. A γ correction circuit for executing reverse γ1 correction on pre- γ1 corrected input video data and then executing γ2 correction, comprising:

means for setting a representative luminance value;

primary conversion means for executing reverse γ1 correction on the representative luminance value so as to generate a primary conversion value;

secondary conversion means for executing γ2 correction on the primary conversion value so as to generate a secondary conversion value;

means for generating a slope and intercept of each straight line of a line graph which pole is the secondary conversion value; and line graph γ correction means for executing γ correction on said input video data by said line graph.

2. The γ correction circuit according to claim 1, wherein said primary conversion means receives γ1 value.

3. The γ correction circuit according to claim 2, wherein said γ1 value is a γ correction value for a cathode ray tube display.

4. The γ correction circuit according to claim 1, wherein said primary conversion means receives a γ1 value and a black level value.

5. The γ correction circuit according to claim 1, wherein said primary conversion means receives a γ1 value and a contrast value.

6. The γ correction circuit according to claim 1, wherein said primary conversion means receives a γ1 value, a red adjustment value, a green adjustment value, and a blue adjustment value.

7. The γ correction circuit according to claim 1, wherein said secondary conversion means has a table denoting a relationship between pre-γ2 correction and post-γ2 correction.

8. The γ correction circuit according to claim 1, wherein said γ2 correction is a γ correction for a liquid crystal display.

9. The γ correction circuit according to claim 1, wherein said γ2 correction is γ correction for a plasma display.

10. A γ correction method for executing reverse γ1 correction on pre-γ1 corrected input video data and then executing γ2 correction, comprising the steps of:

setting a representative luminance value;

executing a reverse γ1 correction on the representative luminance value so as to generate a primary conversion value;

executing γ2 correction on the primary conversion value so as to generate a secondary conversion value;

generating a slope and intercept of each straight line of a line graph which pole is the secondary conversion value; and executing γ correction on said input video data by said line graph.

11. A γ correction system for executing reverse γ 1 correction on pre-γ1 corrected input video data and then executing γ2 correction, comprising:

a primary conversion system that executes reverse γ1 correction on a representative luminance value so as to generate a primary conversion value;

a secondary conversion system that executes γ2 correction on the primary conversion value so as to generate a secondary conversion value;

a system that generates data relating to lines of a graph, a pole of the graph being associated with the secondary conversion value; and a graph γ correction system that performs a γ correction on the input video data in accordance with said graph.

12. The γ correction system according to claim 11, wherein said primary conversion system receives a γ1 value.

13. The γ correction system according to claim 12, wherein said γ1 value is a γ correction value for a cathode ray tube display.

14. The γ correction system according to claim 11, wherein said primary conversion system receives a γ1 value and a black level value.

15. The γ correction system according to claim 11, wherein said primary conversion system receives a γ1 value and a contrast value.

16. The γ correction system according to claim 11, wherein said primary conversion system receives a γ1 value, a red adjustment value, a green adjustment value, and a blue adjustment value.

17. The γ correction system according to claim 11, wherein said secondary conversion system comprises a relationship between pre-γ2 correction and post-γ2correction.

18. The γ correction system according to claim 11, wherein said γ2 correction is a γ correction for a liquid crystal display.

19. The γ correction circuit according to claim 11, wherein said γ2 correction is γ correction for a plasma display.

20. A γ correction method for executing reverse γ1 correction on pre-γ1 corrected input video data and executing γ2 correction, the method comprising:

executing a reverse γ1 correction on a representative luminance value to generate a primary conversion value;

executing γ2 correction on the primary conversion value to generate a secondary conversion value;

generating data related to lines of a graph of which one pole is associated with the secondary conversion value; and executing γ correction on the input video data in accordance with the graph.

* * * * *